US009294493B2

(12) United States Patent
Ben-Itzhak et al.

(10) Patent No.: US 9,294,493 B2
(45) Date of Patent: Mar. 22, 2016

(54) COMPUTER SECURITY METHOD AND SYSTEM WITH INPUT PARAMETER VALIDATION

(71) Applicant: Finjan, Inc., East Palo Alto, CA (US)

(72) Inventors: Yuval Ben-Itzhak, Tel-Aviv (IL); Golan Yosef, Rishon le'Zion (IL); Israel Taub, Nof Ayalon (IL)

(73) Assignee: Finjan, Inc., East Palo Alto, CA (US)

( * ) Notice: Subject to any disclaimer, the term of this patent is extended or adjusted under 35 U.S.C. 154(b) by 0 days.

(21) Appl. No.: 14/482,434

(22) Filed: Sep. 10, 2014

(65) Prior Publication Data

US 2015/0007321 A1 Jan. 1, 2015

Related U.S. Application Data

(63) Continuation of application No. 12/174,592, filed on Jul. 16, 2008, which is a continuation-in-part of application No. 11/354,893, filed on Feb. 16, 2006, now Pat. No. 7,613,918, and a continuation-in-part of application No. 11/298,475, filed on Dec. 12, 2005, now Pat. No. 7,757,289.

(51) Int. Cl.
*G06F 11/00* (2006.01)
*H04L 29/06* (2006.01)
(Continued)

(52) U.S. Cl.
CPC ............ *H04L 63/1425* (2013.01); *G06F 21/54* (2013.01); *H04L 63/1416* (2013.01)

(58) Field of Classification Search
CPC .. G06F 21/54; H04L 63/1416; H04L 63/1425
USPC ...................................... 726/23, 24
See application file for complete search history.

(56) References Cited

U.S. PATENT DOCUMENTS 5,959,717 A 9/1999 Chaum ........................... 352/40
5,974,549 A 10/1999 Golan ............................. 726/23
(Continued)

FOREIGN PATENT DOCUMENTS

WO    WO 99/35583 A2    7/1999   .............. G06F 13/00

OTHER PUBLICATIONS

Written Opinion for Application No. PCT/IB07/02108, dated May 5, 2008, 6 pp.

(Continued)

*Primary Examiner* — Ashok Patel
*Assistant Examiner* — Gary Gracia
(74) *Attorney, Agent, or Firm* — Dawn-Marie Bey; Bey & Cotropia PLLC

(57) ABSTRACT

A security system, including a receiver for receiving a downloadable, a scanner, coupled with the receiver, for scanning the downloadable to identify suspicious computer operations therein, a code modifier, coupled with the scanner, for overwriting the suspicious computer operations with substitute computer operations, if at least one suspicious computer operation is identified by the scanner, and for appending monitoring program code to the downloadable thereby generating a modified downloadable, if at least one suspicious computer operation is identified by the scanner, and a processor, coupled with the code modifier, for executing programmed instructions, wherein the monitoring program code includes program instructions for the processor to validate input parameters for the suspicious computer operations during run-time of the downloadable. A method is also described and claimed.

13 Claims, 3 Drawing Sheets

(51) Int. Cl.
*G06F 21/54* (2013.01)
*G06F 12/14* (2006.01)

(56) References Cited

U.S. PATENT DOCUMENTS

| | | | | |
|---|---|---|---|---|
| 5,983,348 | A * | 11/1999 | Ji | 726/13 |
| 6,018,374 | A | 1/2000 | Wrobleski | 348/744 |
| 6,092,194 | A | 7/2000 | Touboul | 726/24 |
| 6,118,487 | A | 9/2000 | Hirtz et al. | 348/443 |
| 6,154,844 | A | 11/2000 | Touboul et al. | 726/24 |
| 6,167,520 | A | 12/2000 | Touboul | 726/23 |
| 6,529,600 | B1 | 3/2003 | Epstein et al. | 380/252 |
| 6,615,342 | B1 | 9/2003 | Bopardikar et al. | 712/227 |
| 7,272,664 | B2 | 9/2007 | Arimilli et al. | 709/250 |
| 2002/0066022 | A1 | 5/2002 | Calder et al. | 713/200 |
| 2003/0065926 | A1 | 4/2003 | Schultz et al. | 713/188 |
| 2003/0182572 | A1 | 9/2003 | Cowan et al. | 713/200 |
| 2004/0133796 | A1 * | 7/2004 | Cohen et al. | 713/200 |
| 2004/0199827 | A1 | 10/2004 | Muttik et al. | 714/38.1 |
| 2004/0205411 | A1 * | 10/2004 | Hong et al. | 714/38 |
| 2005/0108562 | A1 * | 5/2005 | Khazan et al. | 713/200 |
| 2005/0108733 | A1 | 5/2005 | Bermudez et al. | 719/328 |
| 2005/0120242 | A1 | 6/2005 | Mayer et al. | 713/201 |
| 2005/0198377 | A1 | 9/2005 | Ferguson et al. | 709/238 |
| 2005/0240999 | A1 * | 10/2005 | Rubin et al. | 726/22 |
| 2006/0015940 | A1 * | 1/2006 | Zamir et al. | 726/22 |
| 2006/0026677 | A1 * | 2/2006 | Edery et al. | 726/22 |
| 2006/0161985 | A1 | 7/2006 | Zhao | 726/24 |
| 2007/0016948 | A1 * | 1/2007 | Dubrovsky et al. | 726/22 |
| 2007/0113282 | A1 * | 5/2007 | Ross | 726/22 |
| 2007/0136811 | A1 | 6/2007 | Gruzman et al. | 726/24 |
| 2007/0150957 | A1 | 6/2007 | Hartrell et al. | 726/24 |
| 2007/0288729 | A1 | 12/2007 | Erb | 712/234 |
| 2008/0016570 | A1 | 1/2008 | Capalik | 726/23 |
| 2008/0072053 | A1 | 3/2008 | Halim | 713/176 |
| 2008/0072325 | A1 | 3/2008 | Repasi et al. | 726/23 |
| 2008/0133540 | A1 | 6/2008 | Hubbard et al. | 707/10 |
| 2008/0282338 | A1 | 11/2008 | Beer | 726/12 |

OTHER PUBLICATIONS

International Search Report for Application No. PCT/IB07/02108, dated May 5, 2008, 2 pp.
Kalafut, et al., "A Study of Malware in Peer-to-Peer Networks," ACM, pp. 327-332, 2006.
Ye, et al., "Trusted Paths for Browsers," ACM, pp. 153-186, 2005.
Zhang, et al., "An Approach to Detect Executable Content for Anomaly Based Network Intrusion Detection," IEEE, pp. 1-8, 2007.
Park, et al., "Component Integrity Check and Recovery Against Malicious Codes," IEEE, pp. 1-5, 2006.
Emin Gun Sirer, et al., "Design and Implementation of a Distributed Virtual Machine for Networked Computers," 17$^{th}$ ACM Symposium on Operating System Principles (SOSP '99), Dec. 1999.
Kevin Scott and Jack Davidson, "Safe Virtual Execution Using Software Dynamic Translation," 2002.

* cited by examiner

COMPUTER SECURITY METHOD AND SYSTEM WITH INPUT PARAMETER VALIDATION

PRIORITY REFERENCE TO RELATED APPLICATIONS

This application is a continuation of pending U.S. patent application Ser. No. 12/174,592, filed on Jul. 16, 2008, entitled "COMPUTER SECURITY METHOD AND SYSTEM WITH INPUT PARAMETER VALIDATION," which is a continuation-in-part of U.S. patent application Ser. No. 11/354,893, filed on Feb. 16, 2006, entitled SYSTEM AND METHOD FOR ENFORCING A SECURITY CONTEXT ON A DOWNLOADABLE, now U.S. Pat. No. 7,613,918, and is a continuation-in-part of U.S. patent application Ser. No. 11/298,475, filed Dec. 12, 2005, entitled "SYSTEM AND METHOD FOR INSPECTING DYNAMICALLY GENERATED EXECUTABLE CODE," now U.S. Pat. No. 7,757,289.

FIELD OF THE INVENTION

The field of the present invention is computer security.

BACKGROUND OF THE INVENTION

Computer security software and hardware are used to inspect downloadables, to determine if they are malicious. The term "downloadable" refers generally to an executable application program, which is downloaded from a source computer and run on a destination computer. There are many different types of malicious downloadables, including malware, phishing, spyware, Trojan horses, viruses and worms. Malicious downloadables often enter an internal computer network from an external network, and infect all or most of the computers in the internal network once they break in. As such, computer security systems often employ gateway computers to scan and filter incoming downloadables.

Scanning downloadables at a gateway computer may be performed by running the programs; however, running the programs on the gateway computer instead of on the computer in the internal network for which the programs are intended, may result in the gateway computer failing to detect exploits in the downloadables.

Scanning downloadables at a gateway computer may also be performed by analyzing the programs. Assignee's U.S. Pat. No. 6,092,194 describes such a gateway security system.

When analyzing downloadables, scanners generally search for computer operations that are potentially suspicious. For example, if a suspect downloadable invokes a function call that writes to a file system or opens a network connection or changes a registry entry, such behavior raises a warning flag for potentially malicious activity. A security system may block a downloadable from reaching an internal network if the downloadable includes a suspicious computer operation. However, most non-malicious downloadables use these same computer operations in an innocuous way, and such a security system may block both good and bad downloadables from reaching the internal network.

Consider, for example, a function that deletes a file in the file system. Many safe programs, such as software installation programs, generate temporary files during execution, and delete the temporary files upon completion. However, a malicious program may delete critical operating system files. A security system that blocks downloadables which invoke a function to delete a file would block safe downloadables in addition to the malicious ones.

Consider, for example, a downloadable that includes the following simple JavaScript source code:

```
<SCRIPT LANGUAGE="JavaScript">
    var b = new ActiveXObject("Msxml2.XMLHTTP");
    exploit data = "SSSSSSSSSSSSSSSSSSSSSS exploit";
    b.setRequestHeader(exploit data);
</SCRIPT>
```

This source code initiates a new Msxml2.XMLHTTP ActiveX object, and invokes the object's method setRequestHeader( ). An Msxml2.XMLHTTP object is a standard object built into the Microsoft XML parser. The Msxml2.XMLHTTP object is an important part of the Ajax web development technique, and is used to implement responsive and dynamic web applications. It is used on a client side web page to grab information from the server, process it, and use the information on the current web page (as opposed to having to reload a web page).

The method setRequestHeader( ) is generally a safe function that simply adds an HTTP header to a request. The following code snippet shows how setRequestHeader( ) is used, for example, to set the HTTP Content-Type header to 'text/xml' before sending a request body.

```
var oReq = new XMLHttpRequest( );
oReq.open("POST", sURL, false);
oReq.setRequestHeader(CONTENT, "text/xml");
oReq.send(sRequestBody);
```

As such, the example JavaScript above appears innocuous.

However, the input parameter to setRequestHeader( ) in the example JavaScript code above is only evaluated at run-time, and a code exploit may be triggered in the process of evaluating the input parameter. More generally, input parameters to function calls, even for safe functions, are potential hiding places for code exploits. Since input parameters may only be determined at run-time, such code exploits may go undetected when scanning downloadables.

It would thus be of advantage for a security system to be able to validate input parameters that are evaluated at run-time. It would be of further advantage for a security system to be able to determine if a given input parameter will exploit a non-malicious function, prior to actually executing the non-malicious function with the given input parameter.

SUMMARY OF THE DESCRIPTION

Aspects of the present invention relate to a computer security method and system that validates input parameters to computer operations when scanning a suspect downloadable. In one embodiment, the present invention overwrites suspicious computer operations, and appends special monitoring code to the suspect downloadable that, when invoked, validates input parameters to computer operations.

The present invention may be embodied at a gateway computer, at a server computer, or at a client computer.

There is thus provided in accordance with an embodiment of the present invention a method for identifying suspicious downloadables, including receiving a downloadable, scanning the downloadable to identify suspicious computer operations therein, and if at least one suspicious computer operation is identified, then overwriting the suspicious computer operations with substitute computer operations, and appending monitoring program code to the downloadable thereby generating a modified downloadable, wherein the monitoring program code includes program instructions for validating input parameters for the suspicious computer operations during run-time of the downloadable.

There is additionally provided in accordance with an embodiment of the present invention a computer security system, including a receiver for receiving a downloadable, a scanner, coupled with the receiver, for scanning the downloadable to identify suspicious computer operations therein, a code modifier, coupled with the scanner, for overwriting the suspicious computer operations with substitute computer operations, if at least one suspicious computer operation is identified by the scanner, and for appending monitoring program code to the downloadable thereby generating a modified downloadable, if at least one suspicious computer operation is identified by the scanner, and a processor, coupled with the code modifier, for executing programmed instructions, wherein the monitoring program code includes program instructions for the processor to validate input parameters for the suspicious computer operations during run-time of the downloadable.

There is further provided in accordance with an embodiment of the present invention a method for identifying suspicious downloadables, including receiving a downloadable, and appending monitoring program code to the downloadable thereby generating a modified downloadable, wherein the monitoring program code includes program instructions for identifying suspicious computer operations during run-time of the downloadable, for overwriting the suspicious computer operations with substitute computer operations during run-time of the downloadable, and for validating input parameters for the suspicious operations during run-time of the downloadable.

There is yet further provided in accordance with an embodiment of the present invention a computer security system, including a receiver for receiving a downloadable, a code modifier, coupled with the scanner, for appending monitoring program code to the downloadable thereby generating a modified downloadable, and a processor, coupled with the code modifier, for executing programmed instructions, wherein the monitoring program code includes program instructions for the processor to identify suspicious computer operations during run-time of the downloadable, to overwrite the suspicious computer operations with substitute computer operations during run-time of the downloadable, and to validate input parameters for the suspicious computer operations during run time of the downloadable.

There is moreover provided in accordance with an embodiment of the present invention a method for identifying suspicious downloadables, including scanning a downloadable to detect the presence of at least one suspicious computer operation, dynamically generating during run-time of the downloadable at least one input parameter for the at least one suspicious computer operation detected by the scanning, and determining whether or not the dynamically generated at least one input parameter corresponds to a safe input parameter for the at least one suspicious computer operation.

There is additionally provided in accordance with an embodiment of the present invention a computer security system, including a scanner for scanning a downloadable to detect the presence of at least one suspicious computer operation, and a processor that executes programmed instructions for dynamically generating during run-time of the downloadable at least one input parameter for the at least one suspicious computer operation detected by the scanner, and for determining whether or not the dynamically generated at least one input parameter corresponds to a safe input parameter for the at least one suspicious computer operation.

BRIEF DESCRIPTION OF THE DRAWINGS

The present invention will be more fully understood and appreciated from the following detailed description, taken in conjunction with the drawings in which.

DETAILED DESCRIPTION

Aspects of the present invention relate to a computer security method and system that receives as input a downloadable, and detects whether or not the downloadable is potentially malicious by inter alia validating input parameters to computer operations.

Figure 1:
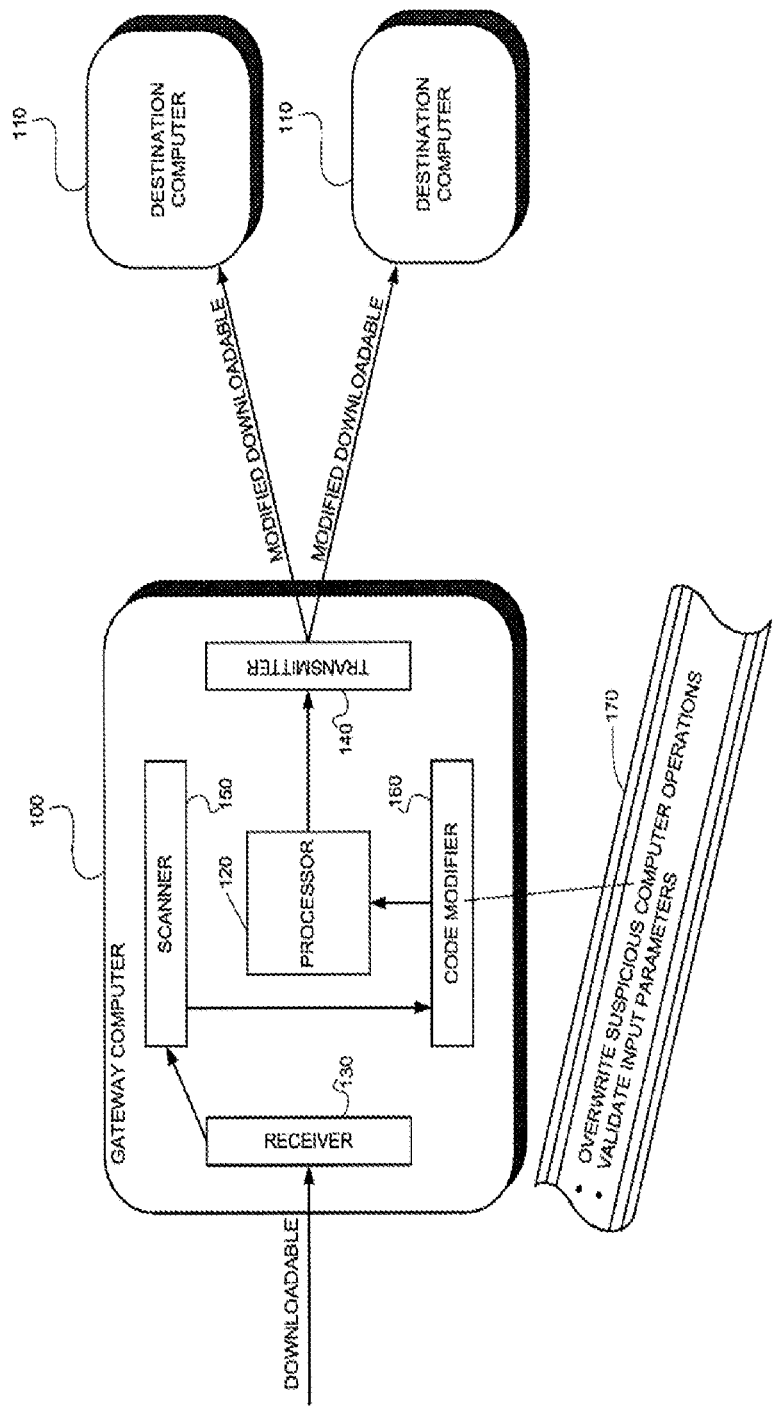
FIG. 1 is a simplified block diagram of a computer security system with input parameter validation, in accordance with an embodiment of the present invention.

Reference is now made to FIG. 1, which is a simplified block diagram of a computer security system with input parameter validation, in accordance with an embodiment of the present invention. The embodiment of the security system shown in FIG. 1 includes a gateway computer 100 and two destination computers 110. Downloadables transmitted to destination computers 110 first pass through gateway 100.

Downloadables may be inter alia in the form of source code, such as JavaScript, or in the form of compiled code, such as Java applets, that is de-compiled in order to derive its source code.

One of the responsibilities of gateway computer 100 is to run security checks on downloadables prior to their reaching destination computers 110. If gateway computer 100 identifies a potentially malicious downloadable, then it either blocks the downloadable from reaching destination computers 110, or neutralizes the potentially malicious portions of the downloadable prior to forwarding the downloadable to destination computers 110.

As shown in FIG. 1, gateway computer 100 includes a processor 120, for executing programmed instructions, a receiver 130 for receiving a downloadable in transit to one or both of destination computers 110, and a transmitter 140 for forwarding the received downloadable to one or both of destination computers 110. Gateway computer 100 further includes a scanner 150, for scanning a downloadable received by receiver 130, and a code modifier 160 for appending special modification code to the downloadable received by receiver 130.

Generally, scanner 150 inspects downloadable source code for the presence of suspicious computer operations. If the downloadable is in compiled object code form, the scanner 150 first de-compiles the object code to derive downloadable source code therefrom, and then inspects the downloadable source code for the presence of suspicious operations.

If no suspicious computer operations are detected, then the downloadable is deemed to be safe, and is forwarded to one or both of destination computers 110 via transmitter 140. However, if scanner 150 detects one or more suspicious computer operations, then processor 120 appends special modification code 170 to the downloadable, thereby generating a modified downloadable. Modification code 170 includes instructions for overwriting the suspicious computer operations detected by scanner 150, and for validating their input parameters. If all input parameters to all suspicious computer operations are validated, then the downloadable is deemed to be safe, and is forwarded to one or both of destination computers 110. Otherwise, the downloadable is deemed to be potentially malicious.

For a downloadable deemed to be potentially malicious, processor 120 may neutralize the suspicious computer operations by eliminating such operations, or by replacing their input parameters with valid input parameters, and then forwarding the remedied downloadable to one or both of destination computers 110. Further, processor 120 may first execute the remedied downloadable within a secure environment and inspect the execution results, prior to forwarding the downloadable. Alternatively, processor 120 may block the downloadable from being forwarded to destination computers 110. Further details of operation of scanner 150 and code modifier 160 are provided in the discussion of FIG. 2 hereinbelow.

Figure 2:
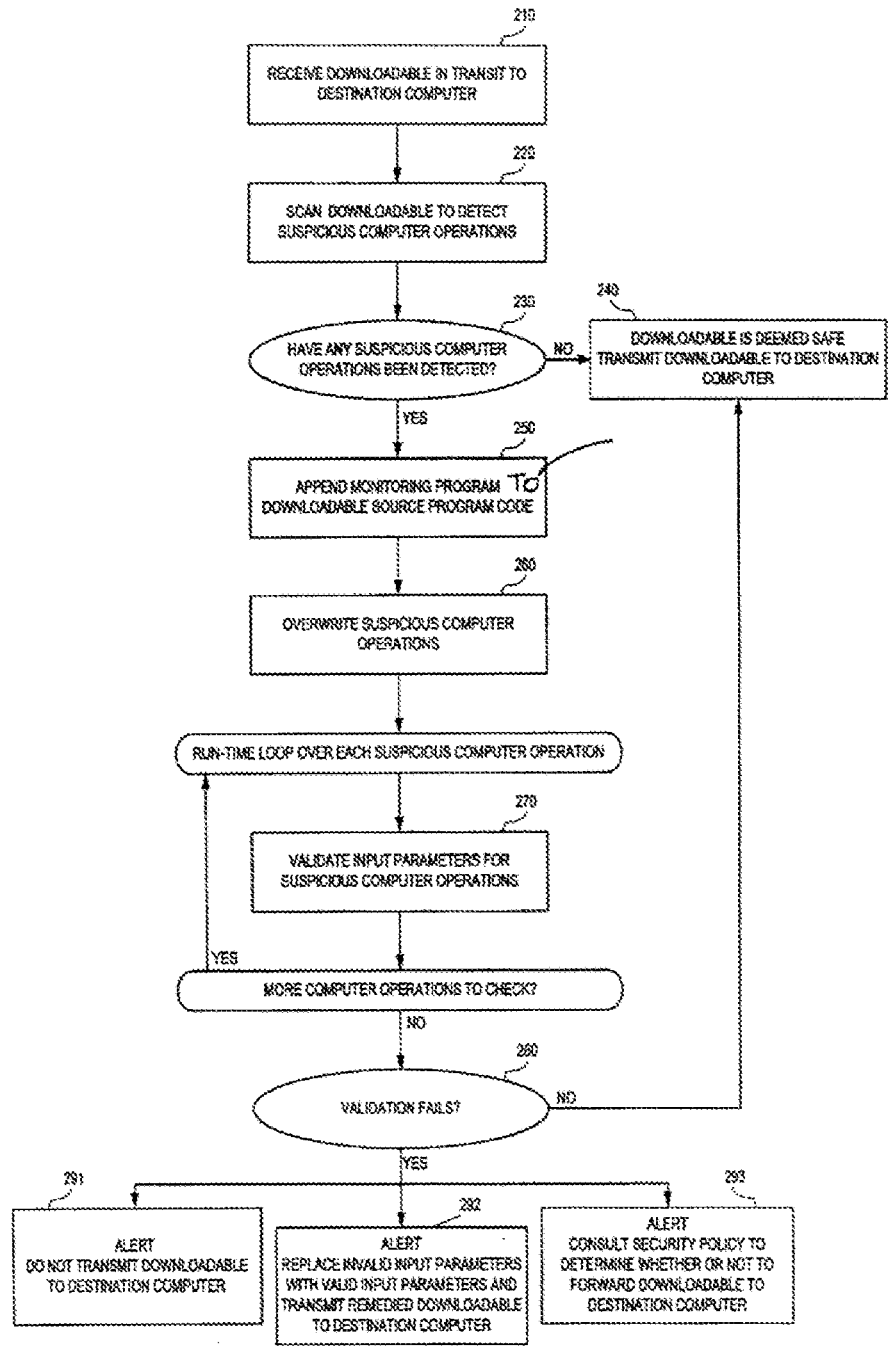
FIG. 2 is a method for computer security with input parameter validation, in accordance with an embodiment of the present invention.

Reference is now made to FIG. 2, which is a method for computer security with input parameter validation, in accordance with an embodiment of the present invention. In conjunction with FIG. 2, reference is also made to the following example downloadable, used to supplement the description of various steps in FIG. 2 by way of example.

```
Original JavaScript source program code:
1   <SCRIPT LANGUAGE="JavaScript">
2   var b = new ActiveXObject("Msxml2.XMLHTTP");
3   b.setRequestHeader("SSSSSSSSSSSSSSSSSSSSSSS");
4   </SCRIPT>
    Modified program code:
5   <SCRIPT LANGUAGE="JavaScript">
6   VulnAcxStruct=[["Msxml2.XMLHTTP", [['setRequestHeader',
7   function( ){allow=["GET", "POST", "HEAD", "DELETE", "PUT",
8   "CONNECT","OPTIONS"]; for(i in allow){if
9   (arguments[0]==allow[i])return;}alert("malicious!")}]],[ ]]]
10
11  function makeVulnObjDict(arr)
12  {
13      dict=new Object( );
14      for(i in arr){
15          diet[arr[i][0]]=[arr[i][2] ,arr[i][3]];
16          dict[arr[i][1]]=[arr[i][2],arr[i][3]];
17      }
18      return dict;
19  }
20
21  Vuln__Obj__Dict=makeVulnObjDict(VulnAcxStruct);
22
23  function checkAcx(acxId)
24  {
25      if (acxId in Vuln__Obj__Dict){
26          obj = new Object( );
27          for(i in Vuln__Obj__Dict[acxId][0])
28          {
29              obj[Vuln__Obj__Dict[acxId][0][i][0]] =
30                  Vuln__Obj__Dict[acxId][0][i][1];
31          }
32          obj['myID'] = acxId;
33          return obj;
34      }
35      return new Object( );
36  }
37
38  window.ActiveXObject = checkAcx;
39  var b = new ActiveXObject("Msxml2.XMLHTTP");
40  b.setRequestHeader("SSSSSSSSSSSSSSSSSSSSSSS");
41  </SCRIPT>
```

FIG. 2 begins at step 210, whereat an original downloadable is received in transit to one or more destination computers. Referring to the example JavaScript code hereinabove, the downloadable received at step 210 includes lines 1-4. These lines of code cause a browser to create an ActiveX object named "Msxmi2.XMLHTTP", and assign the created object to variable b. The setRequestHeader( ) method of object b is called using an input parameter "SSSSSSSSSSSSSSSSSSSSSSS". At this stage it is unclear if the input parameter is legitimate for this method, or if it abuses the method call in a malicious way.

At step 220, the received downloadable is scanned, to detect the presence of suspicious computer operations. Referring further to the example code, the function call setRequestHeader( ) is identified as being suspicious. In one embodiment of the present invention, a dictionary of suspicious operations is accessed and consulted by scanner 150, in order to detect which computer operations are potentially malicious. Such a dictionary is included in lines 6-9 of the example program code, as described below with reference to step 270. In an alternative embodiment of the present invention, a dictionary of non-malicious computer operations is accessed and consulted by scanner 150, in order to detect malicious computer operations.

At step 230 a determination is made whether or not suspicious computer operations have been detected in the downloadable. If not, then the downloadable is deemed safe and is forwarded to its destination at step 240. Otherwise, if one or more suspicious computer operations have been detected, then at step 250 monitoring program code is appended to the original downloadable. Referring to the example above, the monitoring code includes lines 11-36, and has two functions; namely, makeVulnObjDict(arr) and checkAcx(acxId).

At line 21 the function makeVulnObjDict( ) is called with array parameter VulnAcxStruct[ ], to build a dictionary, Vuln_Obj_Dict, of potentially malicious function calls. As seen at lines 6-9, VulnAcxStruct[ ] is an array of three-element arrays, each three-element array corresponding to a potentially malicious function. For purposes of clarity, only one three-element array is defined in lines 6-9, corresponding to the method setRequestHeader( ) of object Msxml2.XMLHTTP, but it will be appreciated by those skilled in the art that additional three-element arrays may be defined. The first element of the three-element array in VulnAcxStruct[ ] is the name of the object containing the potentially malicious function; i.e. "Msxml2.XMLHTTP". The second element of this array is the name of the suspicious method, setRequestHeader( ) together with the function to be used for input validation of the method; namely,

```
function( )
{
    allow = ["GET", "POST", "HEAD", "DELETE", "PUT",
        "CONNECT", "OPTIONS"];
    for (i in allow){
        if(arguments[0]==allow[i]) return;
    }
    alert("malicious!")
}
```

Thus to validate input parameters for the method setRequestHeader( ) the input parameter is matched against six expected non-malicious parameter values GET, POST, HEAD, DELETE, PUT, CONNECT and OPTIONS. If no match is found then an alert is made. It will be appreciated by those skilled in the art that the function given above is but one of many methods for validating input parameters. Other such methods to validate input parameters and to issue a notification when input parameters are not validated, are also within the scope of the present invention.

The third element of the three-element array in VulnAcxStruct[ ], shown empty at line 9, is reserved for a definition of vulnerable properties. In summary form, VulnAcxStruct[ ] holds a list of vulnerabilities, where a "vulnerability" is of the form [object name, list of [method name, definition], properties].

Referring back to FIG. 2, at step 260 the suspicious computer operations are overwritten. Referring to the example JavaScript, the over-writing is performed at lines 29 and 30. Specifically, lines 28-31 loop over the list of [method name, definition] and associate each method name with its corresponding definition.

In addition, at line 8 the function window.ActiveXObject( ) is overwritten by the function checkAcx( ). As such, instead of invoking ActiveXObject( ) during run-time when an ActiveX object is created, the function checkAcx( ) is invoked.

Subsequently the modified downloadable is executed. At step 270 the input parameters for each of the suspicious computer operations are validated during run-time. Referring to the example code, the function checkAcx( ) defined at lines 23-36, performs the validation. Specifically, if the ActiveX object to be created, as identified by acxld, is listed in the dictionary Vuln_Obj_Dict[ ], then the corresponding input validation function is performed. If the validation fails, then the call to alert("malicious!") is made. Otherwise, the desired ActiveX object is created and returned. It will be appreciated by those skilled in the art that other forms of notification of failed validation are within the scope of the present invention. For example, checkAcx( ) may generate a warning text message.

For the example provided above, when the input parameter "SSSSSSSSSSSSSSSSSSSSSS" to setRequestHeader( ) is validated, the validation fails since the input parameter does not match any of the expected input parameters GET, POST, HEAD, DELETE, PUT, CONNECT and OPTIONS. If the input parameter to setRequestHeader( ) had instead been valid, the desired ActiveX object, Msxml2.XMLHTTP, would have been created by checkAcx( ) and returned.

At step 280 a determination is made whether or not the input parameters to each of the suspicious computer operations have been validated. If so, then the downloadable is deemed safe and is forwarded to its destination at step 240. Otherwise, the downloadable is deemed suspicious, an alert is made, and various preventive actions may be taken. One such action, at step 291, is simply not to forward the downloadable to the destination computer. Another such action, at step 292, is to neutralize the input parameters that were not validated, by replacing them with valid input parameters, and then forwarding the remedied downloadable to the destination computer. Another such action, at step 293, is to consult a computer security policy to determine whether or not to forward the downloadable to the destination computer, based on the suspicious computer operations that were detected.

It will be appreciated by those skilled in the art that step 260, of overwriting suspicious computer operations may be performed either in a pre-scan phase, prior to executing the loop around step 270, as indicated in FIG. 2, or instead may be performed in real-time, within the loop. Specifically, referring to the example JavaScript code provided hereinabove, the structure VulnAcxStruct[ ], defined at lines 6-9, which pre-identifies the suspicious computer operations, may be appended to the monitoring code. In turn, the monitoring code overwrites the pre-identified operations in real-time at lines 29 and 30. In this regard, reference is now made to FIG. 3, which is an alternative method for computer security with input parameter validation, with the overwriting being performed during run-time, in accordance with an embodiment of the present invention.

Figure 3:
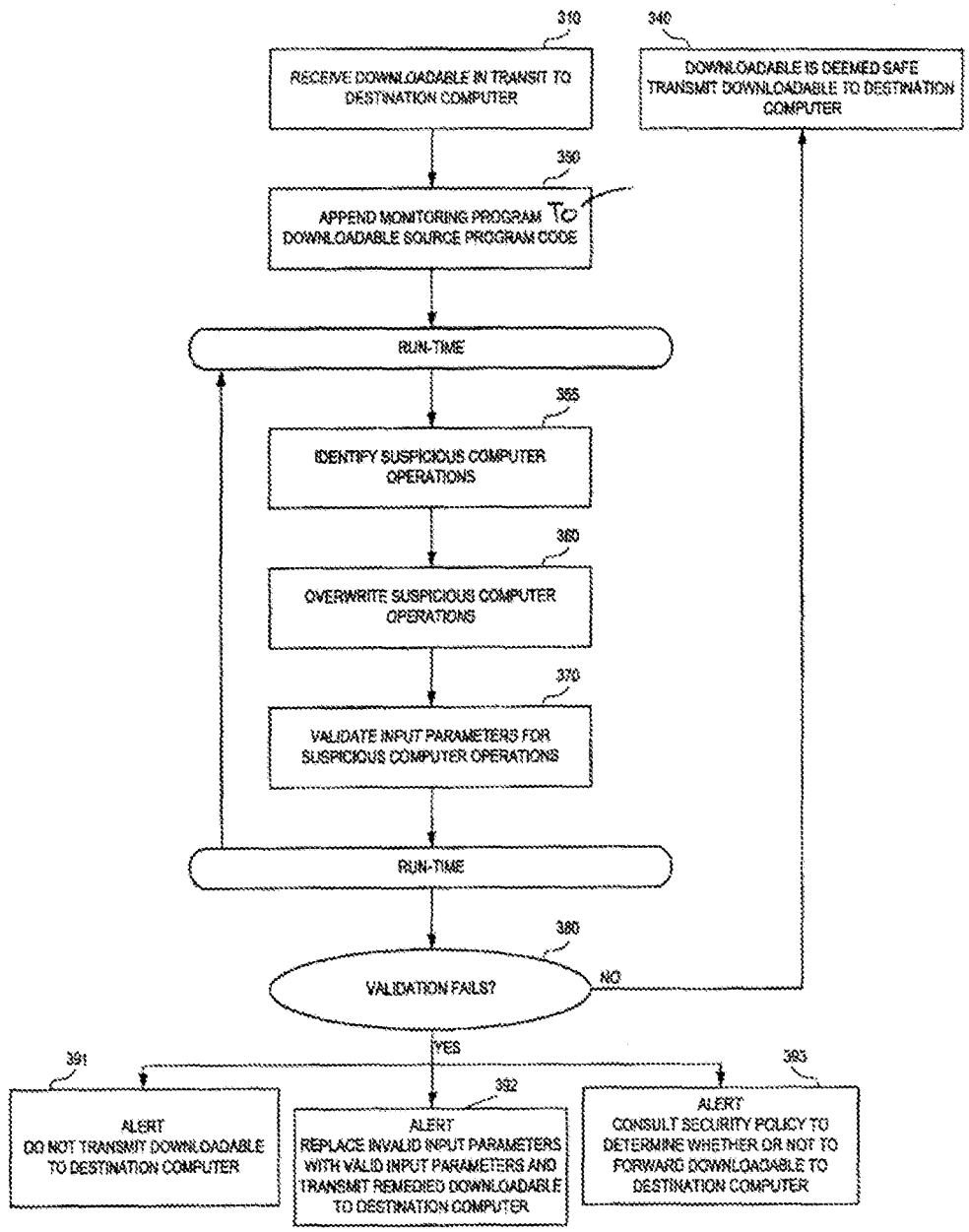
FIG. 3 is an alternative method for computer security with input parameter validation, in accordance with an embodiment of the present invention.

FIG. 3 begins at step 310, whereat an original downloadable is received in transit to one or more destination computers. At step 350 monitoring program code is appended to the original downloadable, to generate a modified downloadable.

Subsequent to step 350 the modified downloadable is executed. At step 355 suspicious computer operations are identified at run-time. Step 355 may be performed by referencing a structure, such as the VulnAcxStruct[ ] structure in the example JavaScript, that lists pre-designated suspicious computer operations. Alternatively, step 355 may be performed by referencing a structure that lists pre-designated non-malicious computer operations.

At step 360 the suspicious computer operations are overwritten at run-time. Referring to the example JavaScript, at lines 29 and 30 the object method
    obj[Vuln_Obj_Dict[acxId][0][i][0]]
is overwritten with the function
    obj[Vuln_Obj_Dict[acxId][0][i][1]].
Based on lines 15 and 16, this corresponds to overwriting the method setRequestHeader( ) of object Msxmk2.XMLHTTP with the function in lines 7-9; namely,

```
function( )
{
    allow = ["GET", "POST", "HEAD", "DELETE", "PUT",
            "CONNECT", "OPTIONS"];
    for (i in allow){
        if(arguments[0]==allow[i]) return;
    }
    alert("malicious!")
}
```

At step 370 the input parameters for the suspicious computer operations are validated at run-time. Referring to the JavaScript example, input parameter validation is performed by the function in lines 7-9. If the input parameters are validated then the function returns normally; otherwise, the function invokes alert("malicious!"). Other such methods to validate input parameters and to issue a notification when input parameters are not validated, are also within the scope of the present invention.

At step 380 a determination is made whether or not the input parameters to each of the suspicious computer operations have been validated. If so, then the downloadable is deemed safe and is forwarded to its destination at step 340. Otherwise, the downloadable is deemed malicious, an alert is made, and various preventive actions may be taken. One such action, at step 391, is simply not to forward the downloadable to the destination computer. Another such action, at step 392, is to neutralize the input parameters that were not validated, by replacing them with valid input parameters, and then forwarding the remedied downloadable to the destination computer. Another such action, at step 393, is to consult a computer security policy to determine whether or not to forward the downloadable to the destination computer, based on the suspicious computer operations that were detected.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims.

Accordingly, the specification and drawings are to be regarded in an illustrative rather than a restrictive sense.

We claim:

1. A computer-based method for identifying suspicious downloadables, comprising:
    receiving, by a receiving computer over a network, a downloadable;
    scanning, by the receiving computer, the downloadable to detect the presence of potentially malicious method calls;
    if at least one potentially malicious method call is detected by said scanning, appending, by the receiving computer, monitoring program code to the downloadable thereby generating a modified downloadable, wherein when executed the monitoring program code calls a function with an array parameter to build a dictionary of method calls, the dictionary including a collection of multi-element arrays, wherein each of the multi-element arrays includes a name of an object, a name of a method of that object, and a function for validating input parameters of that method;
    overwriting, by the receiving computer, in accordance with the monitoring program code, the at least one potentially malicious method call in the downloadable;
    executing, by the receiving computer, a run-time loop over the modified downloadable, wherein upon execution, one or more input parameters for the at least one potentially malicious method call is validated;
    if each of the one or more input parameters is valid, forwarding the downloadable to a destination computer, wherein the forwarded downloadable is in an unmodified format; and
    if one of the one or more input parameters is not valid, providing by the receiving computer, an alert that the downloadable is suspicious.

2. A computer-based method for identifying suspicious downloadables in accordance with claim 1, wherein if one of the one or more input parameters is not valid, replacing by the receiving computer, the input parameters that are not valid with valid input parameters and forwarding the downloadable to a destination compute.

3. A computer-based method for identifying suspicious downloadables in accordance with claim 1, further comprising consulting by the receiving computer, a security policy to determine whether or not to forward the downloadable to a destination computer even though one of the one or more input parameters is not valid.

4. A computer-based method for identifying suspicious downloadables, comprising:
    receiving, by a receiving computer over a network, a downloadable;
    scanning, by the receiving computer, the downloadable to detect the presence of potentially malicious method calls;
    if at least one potentially malicious method call is detected by said scanning, appending, by the receiving computer, monitoring program code to the downloadable thereby generating a modified downloadable, wherein when executed the monitoring program code calls a function with an array parameter to build a dictionary of method calls, the dictionary including a collection of multi-element arrays, wherein each of the multi-element arrays includes a name of an object, a name of a method of that object, and a function for validating input parameters of that method;
    executing, by the receiving computer, a run-time loop over the modified downloadable, wherein upon execution the receiving computer,
        (i) overwrites the at least one potentially malicious method call in the downloadable, and
        (ii) validates one or more input parameters of the potentially malicious method call;
    if each of the one or more input parameters is valid, forwarding the downloadable to a destination computer, wherein the forwarded downloadable is in an unmodified format; and
    if one of the one or more input parameters is not valid, providing by the receiving computer, an alert that the downloadable is suspicious.

5. A computer-based method for identifying suspicious downloadables in accordance with claim 4, wherein if one of the one or more input parameters is not valid, replacing by the receiving computer, the input parameters that are not valid with valid input parameters and forwarding the downloadable to a destination computer.

6. A computer-based method for identifying suspicious downloadables in accordance with claim 4, further comprising consulting by the receiving computer, a security policy to determine whether or not to forward the downloadable to a destination computer even though one of the one or more input parameters is not valid.

7. A computer system with a secure gateway, comprising:
    a gateway computer in communication with one or more destination computers, the gateway computer comprising:
        a receiver for receiving a downloadable in transit to said one or more destination computers;
        a scanner for scanning the received downloadable to detect the presence of potentially malicious method calls;
        a code monitor for (i) appending monitoring program code to the downloadable thereby generating a modified downloadable, if at least one potentially malicious method call is detected by said scanner, wherein when executed the monitoring program code calls a function with an array parameter to build a dictionary of method calls, the dictionary including a collection of multi-element arrays, wherein each of the multi-element arrays includes a name of an object, a name of a method of that object, and a function for validating input parameters of that method, and (ii) overwrite overwriting a call in the downloadable to the at least one potentially malicious method call; and
        a microprocessor for operable to (i) executing a run-time loop over the modified downloadable, wherein upon execution, one or more input parameters for the at least one potentially malicious method call is validated, (ii) forwarding the downloadable to said one or more destination computers, if each of the one or more input parameters is valid, wherein the forwarded downloadable is in an unmodified format, and (iii) provide providing an alert that the downloadable is suspicious one of the one or more input parameters is not valid.

8. A computer system with a secure gateway in accordance with claim 7, wherein the microprocessor replaces the input parameters that are not valid with valid input parameters and forwards the downloadable to one or more destination computers, if one of the one or more input parameters is not valid.

9. A computer system with a secure gateway in accordance with claim 7, wherein the microprocessor consults a security policy to determine whether or not to forward the downloadable to a destination computer even though one of the one or more input parameters is not valid.

10. A secure client computer that receives executable downloadables from other computers, comprising:
- a receiver for receiving a downloadable;
- a scanner for scanning the received downloadable to detect the presence of potentially malicious method calls;
- a code monitor for appending monitoring program code to the downloadable thereby generating a modified downloadable, if at least one potentially malicious method call is detected by said scanner, wherein when executed the monitoring program code calls a function with an array parameter to build a dictionary of method calls, the dictionary including a collection of multi-element arrays, wherein each of the multi-element arrays includes a name of an object, a name of a method of that object, and a function for validating input parameters of that method;
- a microprocessor for executing program instructions including (i) executing a run-time loop over the modified downloadable, wherein upon execution, one or more input parameters for the suspicious at least one potentially malicious method call is validated, (ii) forwarding the downloadable to said one or more destination computers, if each of the one or more input parameters is valid, and (iii) providing an alert that the downloadable is suspicious, if one of the one or more input parameters is not valid.

11. A secure client computer that receives executable downloadables from other computers in accordance with claim 10, wherein the microprocessor replaces the input parameters that are not valid with valid input parameters and forwards the downloadable to one or more destination computers, if one of the one or more input parameters is not valid.

12. A secure client computer that receives executable downloadables from other computers in accordance with claim 10, wherein the microprocessor consults a security policy to determine whether or not to forward the downloadable to a destination computer even though one of the one or more input parameters is not valid.

13. A secure client computer that receives executable downloadables from other computers in accordance with claim 10, wherein the code modifier overwrites a call in the downloadable to the at least one potentially malicious method call with a modified call that invokes the function for validating input parameters of the potentially malicious method call prior to the microprocessor executing a run-time loop.

* * * * *